United States Patent [19]

Leibowitz et al.

[11] Patent Number: 4,500,173

[45] Date of Patent: Feb. 19, 1985

[54] ELECTROLUMINESCENT LAMP FOR LIQUID CRYSTAL DISPLAY

[75] Inventors: Marshall Leibowitz, Ridgefield; Douglas A. George, Watertown, both of Conn.

[73] Assignee: Timex Corporation, Waterbury, Conn.

[21] Appl. No.: 490,621

[22] Filed: May 2, 1983

[51] Int. Cl.³ .................. G02F 1/133; H05B 37/00
[52] U.S. Cl. .................. 350/345; 315/169.3; 428/917
[58] Field of Search .............. 350/338, 345; 365/110, 365/111; 315/169.3; 430/917

[56] References Cited

U.S. PATENT DOCUMENTS

| | | | |
|---|---|---|---|
| 2,698,915 | 1/1955 | Piper | 315/169.3 |
| 2,851,634 | 9/1958 | Kazan | 315/169.3 |
| 3,110,836 | 12/1963 | Blazek | 315/169.3 |
| 3,712,827 | 1/1973 | Gramza | 428/917 |
| 4,142,781 | 3/1979 | Baur et al. | 350/345 |

Primary Examiner—John K. Corbin
Assistant Examiner—David Lewis
Attorney, Agent, or Firm—William C. Crutcher; Joseph A. Biela

[57] ABSTRACT

A backlighted liquid crystal display is disclosed which includes an electroluminescent backlight having a reduced amount of phosphor acting as both a source of light for viewing the display during nighttime hours and as a light diffuser for viewing the display during daytime hours. The electroluminescent backlight is made thinner while the phosphor content is optimally reduced to provide a backlight that improves the viewability of the display especially during daytime hours without the need of a transflector. Wherein the minimal amount of phosphor is dispersed in a binder in the electroluminescent layer is substantially 1 volume unit of phosphor for every 4 to 5 volume units of binder.

6 Claims, 5 Drawing Figures

ELECTROLUMINESCENT LAMP FOR LIQUID CRYSTAL DISPLAY

BACKGROUND OF THE INVENTION

This invention relates to passive liquid crystal displays of the type which employ a backlight for illuminating the display in the dark.

Passive liquid crystal displays (LCDs) provide advantages over those displays having light emitting diodes (LEDs) in that information is always being displayed and is readable even in bright sunlight. However, LCDs depend on ambient light and are not visible in a dark environment unless some form of support lighting system is implemented to backlight the display. The source of energy for a support lighting system is typically provided by one or more batteries.

Incandescent light bulbs are used as a light source for backlighting LCDs and can be made sufficiently small so as to minimize the amount of current drawn from the energy source. An incandescent backlight for illuminating a liquid crystal display in a dark environment is described in U.S. Pat. No. 3,712,047 issued to Gerard. However, major problems concerning the use of incandescent light bulbs for backlighting LCDs include inadequate dispersion and diffusion of light, high power consumption, and poor quality filaments used in such bulbs. Poor quality filaments generally have short lifetimes. Other problems associated with incandescent backlights is the difficulty of properly encasing each filament in a glass enclosure especially of the size required in small LCDs such as those used in timepieces.

Radioluminescent materials have been used as a source of light for backlighting LCDs. Radioactive materials such as tritium or promethium generate radiant energy in the form of electrons which are permitted to bombard radioluminescent materials. The electrons are produced by the deterioration of heavy hydrogen atoms. Radioluminescent material includes a variety of phosphors which reradiate some of the absorbed energy as visible light. The emitted light has a wavelength that is characteristic of the particular phosphor material used. The phosphor therefore is actually a source of light that provides some advantages over incandescent light bulbs. The fact that no external energy source is needed to provide for continuous light output and the fact that no filaments burn out or no glass enclosures break are just some advantages provided by the use of radioluminescent materials over incandescent light bulbs. However, radioactive material such as tritium can produce secondary radiation having very short wavelengths thereby creating a potential health problem. Tritium backlights are, therefore, generally placed in metal containers which act as shields against excessive emissions of radiation. Nevertheless, tritium backlights, which are sealed glass bulbs internally coated with a phosphor and filled with tritium gas, can still emit high levels of radiation depending upon the size of the backlight. For example, a two-bulb tritium light emits three times the radiation of a three-bulb tritium light since, in order to obtain high intrinsic brightness, each bulb in the two-bulb light is pressurized. Furthermore, a smaller tritium backlight helps to reduce cost since tritium is expensive and can account for the greatest part of the cost of most tritium lights. Since an intrinsically brighter two-bulb light is frequently used as a backlight in LCDs, and since a two-bulb light emits a considerable amount of radiation, a two-bulb tritium backlight poses a potential health hazard. Another problem associated with tritium backlighting systems is the generally shortened bulb life due to the entrapment of residual moisture during bulb manufacture. The residual moisture reacts with the tritium to form non-radioactive hydrogen peroxide. Also, as suggested above, the cost of a tritium backlighting system prohibits its acceptance as a replacement for incandescent backlighting systems. Light produced by radioactive light sources are discussed in U.S. Pat. No. 3,701,900 issued to Thuler; U.S. Pat. No. 3,566,125 issued to Linhart et al.; U.S. Pat. No. 3,204,103 issued to Johnson et al.; U.S. Pat. No. 4,126,384 issued to Goodman et al.; and U.S. Pat. No. 4,221,112 issued to Enomoto et al.

Attempts have been made to use fluorescent materials as a source of light for backlighting LCDs. The fluorescent material is activated by ambient light during the daytime to emit visible light during hours of darkness. However, light emitted from fluorescent materials is not bright enough for any length of time to be useful for most backlighting applications. Furthermore, fluorescent materials need to be frequently rejuvenated by ultra-violet and infrared light. However, ultra-violet and infrared light transmission through the LCD is impaired and cannot efficiently reach the underlying fluorescent material thereby reducing the level of brightness attainable by a backlight of this type. U.S. Pat. No. 4,276,633 issued to Takami et al. discloses a self-luminescent light source comprising a fluorescent substance.

Transflectors have been implemented, especially those with high transmissive properties, for efficiently transmitting light from a light source through the LCD for improving the viewability of the display at night. U.S. Pat. No. 4,196,973 issued to Hochstrate, for example, discloses a transflector for illuminated electrooptic displays. A standard backlighted LCD typically includes a liquid crystal cell having image-forming electrodes, upper and lower polarizers on opposite sides of the cell, and a transflector behind the lower polarizer. A light source is positioned behind or at the side of the transflector for directing light therein. The transflector functions essentially as a one-way mirror so that the display can operate in the reflective mode in ambient light and in the transmissive mode at night with the aid of backlighting by the light source. In daylight, ambient light enters the display and passes through the liquid crystal cell, where it may be optically altered and then is reflected from the transflector back toward the observer. Light provided by the backlight is generally reflected due, in part, to a plurality of facets on the back of the transflector diffuser layer and, in part, to the total transflector reflector layer. At night, the transflector receives light from the light source and transmits it upwardly toward the observer by light scattering, diffusion, and reflection within the transflector. As a result of the light diffusion effected by the transflector, the display characters are more or less uniformly illuminated. A typical transflector may comprise silvered glass or glass with a gray filter. However, other materials which are translucent to light have also been widely used. For example, styrofoam of white, gray, or silver hue, polystyrene and polypropylene in thin layers or sheets.

Choice of the correct transflector material is the most critical element in prior art backlighted LCDs since it must provide optimal light output in both the light transmissive and light reflective modes, i.e. during both nighttime and daytime hours, Ideally, the transflector should have highly reflective properties under all levels of ambient light conditions during daytime hours and highly transmissive properties during nighttime hours. However, improving the nighttime viewability of a display by improving the transmissive properties of its transflector can adversely affect the quality of the daytime viewability of the display by reducing, for example, the contrast between the images formed and the background.

When a tritium backlighting system is implemented with a display having a transflector, much of the light provided by the tritium is lost in the transflector thereby reducing the contrast between the images formed and the background. Therefore, any attempt to improve the transmission of light emitted from a tritium backlighting system for nighttime viewing of the LCD reduces the reflectivity (reflectance) of the transflector and diminishes the quality of images formed when viewed in the daytime. Selection of a transflector that does not adversely affect reflectance and the contrast ratio of the LCD is particularly critical when using a tritium backlighting system.

Also, when an incandescentt backlighting system is implemented, the selection of a transflector having an optimal diffuser layer is critical in obtaining efficient light transmission and reflection for high-quality LCD viewability. The thickness of the diffuser layer affects the light dispersion properties of the display such that the thicker the diffuser, the better the light dispersion and the better the viewability. However, in small LCDs, a thick transflector diffuser layer may, in some cases, be undesirable since it would add to the thickness of the display.

Diffuser layers in transflectors present additional problems especially when used with incandescent light bulbs. For example, strain patterns generally form in the diffuser layers and become illuminated with polarized light. This gives rise to background shadows on the display and non-uniformity of light dispersion. To attempt to reduce the amount of strain patterns in the diffuser layer, careful transflector molding techniques are required in which mold time and temperature are critical parameters. Another critical feature of prior art transflectors is the faceting pattern provided on one surface of the diffuser layer. Also, optical coupling of an incandescent backlight bulb to the transflector diffuser layer is critical in that the center line of the filament must match the center line of the diffuser layer to provide optimum light dispersion. Optimal light dispersion is possible when the bulb diameter is equal to the diffuser layer thickness. However, with the implementation of larger incandescent bulbs and thinner LCDs, matching center lines and allocating space for the incandescent backlighting system becomes a problem.

Another type of backlight that can be used to provide illumination of liquid crystal displays utilizes electroluminescent material. However, electroluminescent backlighting systems have not been seriously considered for backlighting LCDs in the past because of the excessive voltages required to operate the system, i.e. generally over 50 volts. Also, an electroluminescent backlight, when used with a transflector, produces poor daylight LCD viewability since the reflective properties of the transflector are not as good as the reflective properties of, for example, metal mirrors. U.S. Pat. No. 4,238,793 issued to Hochstrate discloses an electroluminescent panel for use as a backlight in an electrooptical display.

U.S. Pat. No. 4,208,869 issued to Hanaoka shows a liquid crystal display device equipped with an illumination device. The illumination device is an EL sheet disposed at the back of the display. The EL sheet includes a transparent or light-diffusive semitransparent substrate with a thin film which serves as an electrode, and a metallic sheet. Between the light-diffusive substrate and metallic sheet is disposed electroluminescent material. The EL sheet has a reflective surface for the purpose of reflecting available light. The reflective surface offers diffused reflection due to the use of zinc sulfide crystals as the main ingredient of the electroluminescent material. Furthermore, it is suggested that a layer be interposed between the liquid crystal display and the EL sheet which permits both diffusion and transmission of light and which may be employed as a supporting medium and incorporated in the laminated structure of the device. This layer would appear to be a transflector. There is no discussion of reducing the amount of phosphor in the electroluminescent material to provide for light diffusion for improving the daytime viewability of the liquid crystal display. Also, there would appear to be no light reflection from the metallic sheet since the metallic sheet is coated with a non-transparent barium titanate film.

Other pertinent patents include U.S. Pat. No. 3,869,195 issued to Aldrich which discloses a liquid crystal display and a segmented electroluminescent source of backlighting; U.S. Pat. No. 4,291,947 issued to Cirkler et al. which discloses the process for making a passive LCD; U.S. Pat. No. 3,613,351 issued to Walton which discloses an LCD and a power supply system for a timepiece; U.S. Pat. No. 4,128,312 issued to Lim et al. which discloses an LCD containing a high reflectivity cathode; U.S. Pat. No. 3,837,729 issued to Harsch which discloses an LCD utilizing a reflector assembly on one side of the liquid crystal material; and U.S. Pat. No. 3,728,007 issued to Myrenne et al. which discloses a reflective liquid crystal display containing a mirror.

Therefore, it is an object of this invention to improve the daylight viewability of backlighted LCDs without employing a transflector.

It is an object of this invention to use an electroluminescent backlighting system for an LCD in which the LCD exhibits improved viewability especially during daylight hours.

It is also an object of this invention to reduce the number of critical parameters required to achieve optimal viewability of backlighted LCDs during daytime and nighttime hours.

It is a further object of this invention to implement the electroluminescent material both as a light source and as a light diffuser.

Another object of this invention is to obtain improved viewability and image contrast by using a minimum number of components for the backlighted LCD.

SUMMARY OF THE INVENTION

An improved combination electroluminescent backlight and light-reflective electrode for a liquid crystal display for nighttime and daytime viewing is disclosed. The improvement includes a light-reflective electrode in the electroluminescent backlight for reflecting incident light through the liquid crystal display, and a thin electroluminescent layer in the electroluminescent backlight between the light-reflective electrode and the liquid crystal display having a minimal amount of phosphor selected for providing light diffusion for improving daytime viewing of the liquid crystal display as well as for providing a light source for improving nighttime viewing of the liquid crystal display. Wherein the minimal amount of phosphor is dispersed in a binder in the electroluminescent layer is substantially 1 volume unit of phosphor for every 4 to 5 volume units of binder.

DESCRIPTION OF THE PREFERRED EMBODIMENTS

Figure 1:
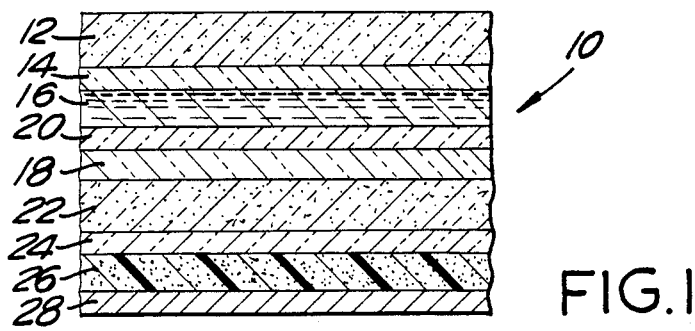
FIG. 1 is a cross-sectional side view of an embodiment of a backlighted liquid crystal display in accordance with the present invention.

Backlighted liquid crystal display (LCD) 10 is shown in FIG. 1. The LCD is backlighted by an electroluminescent (EL) panel which includes phosphor material that not only is made to luminesce to provide for nighttime viewing of the display but that also acts as a light diffuser to provide for improved daytime viewing of the display. The EL panel also includes a metal reflector electrode that reflects light incident thereon through the LCD to further provide for improved daytime viewing of the display.

Backlighted display 10 includes first polarizer layer 12, first transparent substrate 14 having transparent image electrodes thereon (not shown), liquid crystal layer 16, second transparent substrate 18 having transparent common electrode 20 thereon, second polarizer layer 22 having its axis crossed relative to the first polarizer layer, first transparent EL panel electrode 24, electroluminescent layer 26, and second EL panel light-reflective electrode 28. It is well known in the art: that the liquid crystal layer includes twisted nematic liquid crystal material having, typically, a positive dielectric anisotropy; that the transparent electrodes are made of either tin or indium oxide; that the liquid crystal material is sealed between substrates 14 and 18 by means of an epoxy resin (not shown); that the electroluminescent layer includes a phosphor dispersed in a transparent binder such as epoxy; that the electroluminescent layer sandwiched between the EL panel electrodes together form the EL backlight; that the backlight portion of the LCD, comprising electrodes 24 and 28 and electroluminescent material 26, is positioned behind the display portion of the LCD, distal to the observer, to permit nighttime viewing of the display images; that the display images are formed due to the shape and position of the transparent image electrodes on transparent substrate 14; and, that the transparent image electrodes on the first substrate are opposite at least one electrode on the second substrate such that the electrodes on the first and second substrates are proximal to each other. Furthermore, the functional aspects of LCDs are known in the art and will not be explained except to the extent necessary to describe the invention disclosed herein.

In accordance with the present invention, improved backlighted liquid crystal display 10 utilizes the phosphor material in electroluminescent layer 26 as a source of light as well as an effective light diffuser. It is known in the art that when a voltage potential is applied by an electronic circuit means across the opposing electrodes of an electroluminescent panel, the phosphor material sandwiched between the electrodes will be excited to luminesce due to the electric field induced by the applied voltage. In accordance with the invention, the thickness of electroluminescent layer 26 is adjusted and, at the same time, the amount of phosphor material dispersed in the binder is reduced to the point where the phosphor acts as an efficient light diffuser for improving daytime viewability of the LCD.

Obviously, reducing the amount of phosphor in the binder reduces the brightness of the light provided by the electroluminescent panel depending upon the magnitude of the voltage applied thereto. However, since no transflector is needed (and should not even be used) to enhance daytime viewing of the LCD, the light given off by the EL phosphor at night, even though the amount of phosphor is reduced, actually improves the viewability (contrast ratio) of the LCD. That is, the nighttime viewability of a typical EL backlighted LCD having a standard amount of phosphor in the EL layer and having a transflector can be improved upon by removing the transflector and reducing the amount of phosphor in the EL layer from the standard amount. In a standard EL backlight, there is dispersed one (1) volume unit of phosphor for each volume unit of binder whereas in the El backlight of the present invention, there is dispersed one (1) volume unit of phosphor for every four (4) to five (5) volume units of binder. The thickness of the EL layer is also adjusted, i.e. made thinner. The improved nighttime viewability arises because a transflector is not used. The transflector, if implemented, would further reduce the amount of light transmitted through the LCD since the amount of the light produced by the EL layer is already reduced due to the minimal amount of phosphor in the layer. This is unacceptable especially since the light is provided by luminescent phosphors. In the present invention, even though the phosphor content of the binder in the thinner EL layer is reduced in comparison to the standard amount used in prior art EL panels of comparable size, the contrast ratio of the LCD at night remains high since no transflector is used which would further impede the transmission of light provided by the EL backlight.

Furthermore, since the El layer is thinner and the phosphor content is reduced, the phosphor acts as a light diffuser to provide for improved viewability of the LCD during the daytime hours. The ambient light passes through the display, as is well understood, and is reflected by second light-reflective electrode 28. The reflected light is dispersed by the phosphor which acts as an efficient light diffuser thereby improving the daytime viewability of the LCD. Reflectivity or reflectance, which is defined as the ratio between the quantity of light that is reflected from a reflector and the quantity of light incident on the reflector, has been measured for the displays described below:

1. For a standard LCD employing a transflector and backlighted by a standard EL backlight, the daylight reflectivity was approximately seven (7) percent.

2. For a standard LCD without a transflector and backlighted by an EL backlight having a reduced amount of phosphor dispersed in the binder and having a light-reflective electrode in accordance with the present invention, the daylight reflectivity was approximately ten (10) percent.

3. For a standard LCD without a backlight but utilizing a high quality light reflector, the daylight reflectivity was approximately eleven (11) percent.

The reflectivity of the display of the present invention is at least eight-five (85) percent of the reflectivity of a standard LCD (defined above) that does not utilize an EL backlight. All of the measurements were made in a room under ambient light conditions using a photometer. The ambient light level was approximately fourteen (14) foot Lamberts.

The attributes of backlighted liquid crystal display 10 make the device especially useful not only in horological instruments such as wristwatches, but for displays in aircraft cockpits or displays on automobile dashboards. For a backlighted LCD for a wristwatch in accordance with the present invention, the optimum amount of phosphor in the binder of the EL backlight layer is less than twenty-five (25) percent of the amount of phosphor used in prior art EL backlighted displays of comparable size. However, as the amount of phosphor is reduced much below twenty-five (25) percent, the likelihood becomes great than a diffuser layer would be needed between the EL backlight and the LCD in order to provide for more light dispersion. In any case, the amount of phosphor in the binder of the El backlight layer should not be reduced below five (5) percent of the amount of phosphor used in standard EL backlights of comparable size. The driving circuit means for display 10 (not shown) is one that provides approximately 40 microamperes of current at approximately 60 Hertz although multiplexed EL backlight segments can be implemented to provide for improved viewability of the LCD but which require less current for each segment. It is understood that the optimal amount of phosphor that can efficiently emit light and still be used as an effective light source varies inversely with the magnitude of the driving circuit voltage, i.e. the higher the driving circuit voltage, the lower the phosphor content in the EL layer. The fundamental point is that if an EL backlighted LCD does not employ a transflector, the phosphor content in the EL layer can be reduced and the layer itself can be made thinner without adversely affecting the viewability of the display at night and, in fact, improving the viewability of the display during the daytime. Viewability of the LCD, which would be defined in terms of contrast ratio, is improved over an EL backlighted LCD of comparable size which has a transflector and in which the amount of phosphor material is not reduced but is substantially in a 1:1 (volume to volume) proportion with the binder. Improved viewability may also be described as contrast enhancement which means improved contrast between display images and background due to light intensity, wavelength, or both. Contrast is usually expressed in terms of a contrast ratio as is known in the art. It was found that in the present invention, removing the transflector and reducing the phosphor content actually produces an EL backlighted LCD having improved viewability due to increased light transmission at night since no transflector is used which would otherwise impede the transmission of light produced by the EL panel and having improved viewability due to increased reflectivity during the day.

Therefore, for the invention disclosed herein, optimal viewability of the LCD at all times appears to be critically dependent on the thickness of the EL backlight layer and the (reduced) amount of phosphor dispersed in the EL layer binder for a given driving circuit voltage. The higher the driving circuit voltage, the less the amount of phosphor needed to maintain a substantially constant optimal LCD contrast ratio. This is certainly an improvement over the prior art since viewability of prior art LCDs is critically dependent on many more parameters as described above.

It is well-understood that light-reflective EL electrode 28 is a metal reflector made of either aluminum foil, evaporated aluminum or metallized plastic and that transparent EL panel electrode 24 is transparent conductive material on either glass or plastic. If a birefringent plastic such as Mylar (registered trademark of E. I. Du Pont de Nemours & Co.) is used as transparent EL panel electrode 24 for an EL backlight in conjunction with a twisted nematic LCD, it would appear to be necessary to include a light diffuser between the backlight and the LCD in order to prevent undesirable optical effects. Furthermore, the El panel may be constructed by any technique known in the art to include lamination, deposition, or screening.

Figure 2:
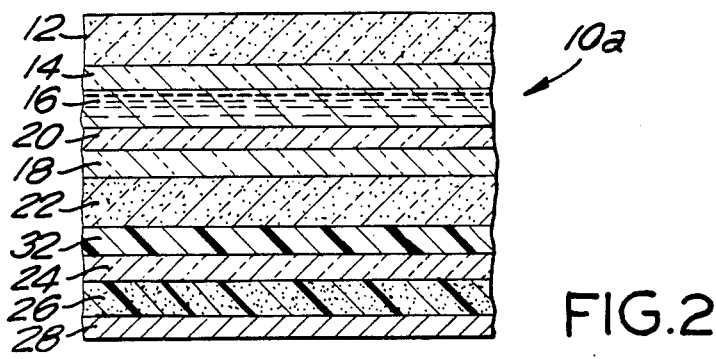
FIGS. 2-5 are cross-sectional side views of other embodiments of backlighted liquid crystal displays in accordance with the present invention.

FIG. 2 shows display 10a which is another embodiment of the present invention illustrated in FIG. 1 with the only difference being the addition of diffuser layer 32 between first transparent EL panel electrode 24 and second polarizer layer 22. The diffuser layer, which is typically a polyester film, may be helpful but not required to provide additional light dispersion depending upon the characteristics of the reflector, the phosphor material and/or the transparent substrates and electrodes actually used.

Figure 3:
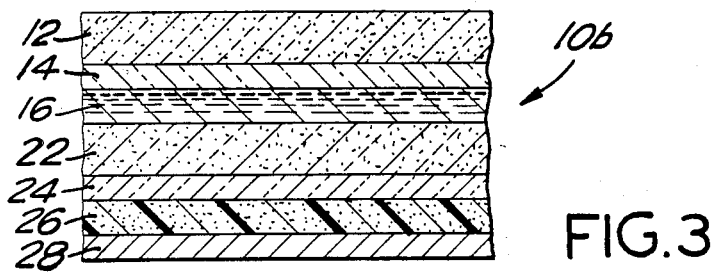

FIG. 3 shows display 10b which is another embodiment of the present invention illustrated in FIG. 1 with the only difference being the removal of second transparent substrate 18 and transparent common electrode 20. In effect, substrate 18 and electrode 20 have been functionally replaced by either of the EL panel electrodes 24 or 28 which is now used not only for exciting the phosphor in the EL backlight to luminesce but also as the opposing common electrode for each of the transparent image electrodes (not shown) on transparent substrate 14. Although the structure is slightly different, the operation and performance of the El backlighted LCD shown in FIG. 3 is substantially equivalent to the operation of the EL backlighted LCD of FIG. 1 in accordance with the invention disclosed herein.

Figure 5:
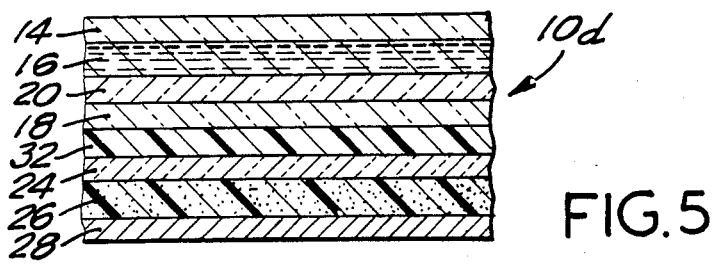

Another embodiment of the invention as shown by display 10d in FIG. 5 involves nothing more than using guest/host liquid crystal material instead of the twisted nematic material for liquid crystal layer 16. In this case, no polarizer layers, 12 and 22, are used thereby reducing even further the number of layers comprising EL backlighted LCD 10. By reducing the number of layers, the overall width of the display is made thinner. As is known in the art, polarizers are typically used with nematic liquid crystal material because of the birefringent properties of the liquid crystal material in the presence of an electric field.

Figure 4:
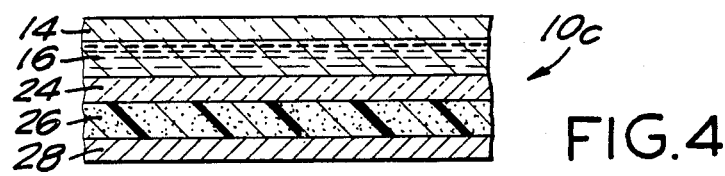

In view of the descriptions provided above, it would be obvious to combine the advantages features of each embodiment with others known in the art. For example, using a guest/host liquid crystal material in the display shown in FIG. 3 would permit the removal of the polarizer layers, 12 and 22. Therefore, if a guest/host liquid crystal were used in an embodiment of the invention as shown in FIG. 3, the EL backlighted LCD would comprise first transparent substrate 14 having image electrodes thereon, liquid crystal layer 16, first transparent EL panel electrode 24, electroluminescent layer 26, and second light-reflective EL panel electrode 28. This particular embodiment is shown as display 10c in FIG. 4 and possesses the same characteristics and advantages as described above for the embodiment shown in FIG. 1. It is clear that the present invention also obtains improved viewability and image contrast over the prior art devices by implementing fewer components and a thinner EL layer as is evident by the embodiment shown in FIG. 4.

While the invention has been explained with respect to certain specific embodiments, it is understood that other uses are possible and that various modifications and substitutions can be made within the scope of the appended claims.

What is claimed is:

1. An improved combination electroluminescent backlight and incident light reflector for a liquid crystal display for nighttime and daytime viewing, respectively, the improvement comprising:
    a liquid crystal display
    a light-reflective electrode in said electroluminescent backlight arranged to reflect incident light entering and passing through said liquid crystal display, and
    a thin electroluminescent layer in said electroluminescent backlight between said light-reflective electrode and said liquid crystal display having a minimal amount of phosphor selected to provide for light diffusion for improving daytime viewability of said liquid crystal display as well as to provide a light source for improving nighttime viewability of said crystal display, in which said minimal amount of phosphor is dispersed in a binder in said electroluminescent layer in substantially one volume unit of phosphor for every four to five volume units of binder.

2. The improved combination electroluminescent backlight and incident light reflector of claim 1 in which said minimal amount of phosphor is dispersed in a binder in said electroluminescent layer in substantially the volume to volume ratio of 1 to 4.

3. The improved combination electroluminescent backlight and incident light reflector to claim 2 in which said phosphor in said electroluminescent layer is selectively activated by an applied voltage produced by an electronic circuit means, and also selectively serves as a diffuser for light reflected from said light-reflective electrode when the electroluminescent layer is not activated.

4. The improved combination electroluminescent backlight and incident light reflector of claim 1 in which said light-reflective electrode is metal.

5. The improved combination electroluminescent backlight and incident light reflector of claim 4 in which said metal is aluminum.

6. The improved combination backlight and incident light reflector of claim 1, in which said binder is transparent epoxy resin.

* * * * *